Jan. 1, 1963  J. S. FINGER ET AL  3,071,180
APPARATUS FOR CONTINUOUSLY PRODUCING
REINFORCED PLASTIC STRUCTURAL PANELS
Filed Nov. 23, 1953
4 Sheets-Sheet 1
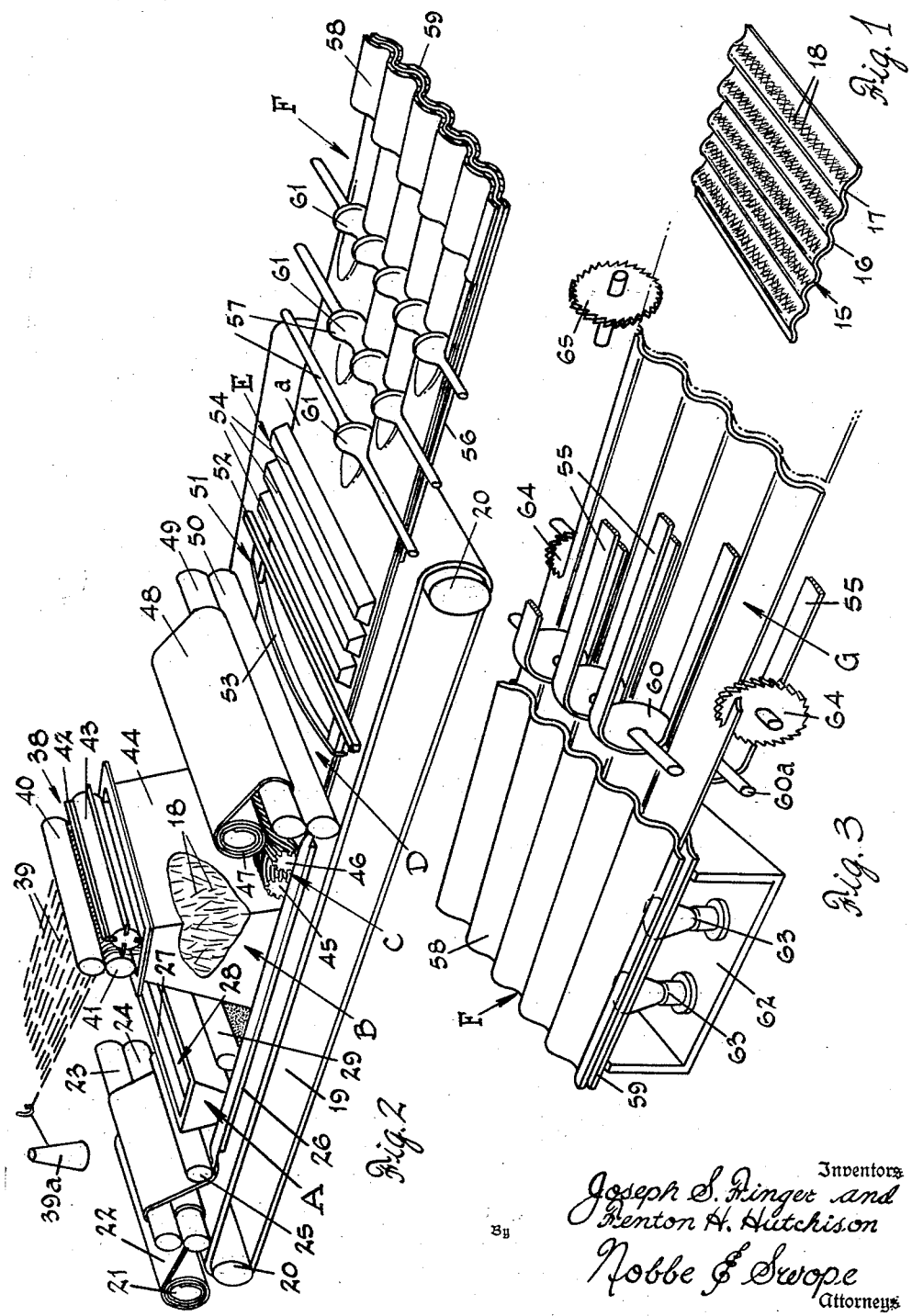
Inventors
Joseph S. Finger and
Renton H. Hutchison
By Nobbe & Swope
Attorneys

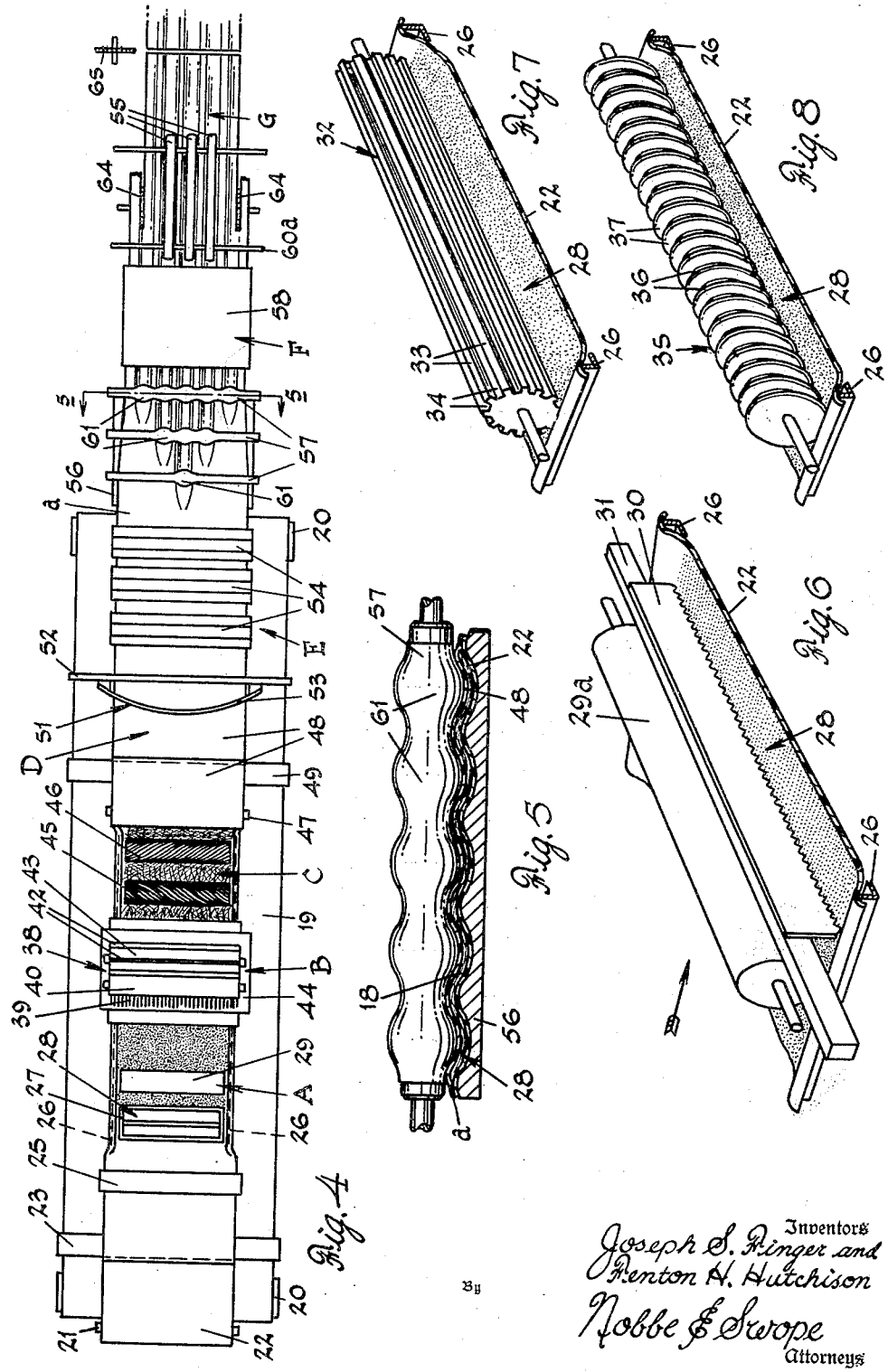

Jan. 1, 1963    J. S. FINGER ET AL    3,071,180
APPARATUS FOR CONTINUOUSLY PRODUCING
REINFORCED PLASTIC STRUCTURAL PANELS
Filed Nov. 23, 1953    4 Sheets-Sheet 3
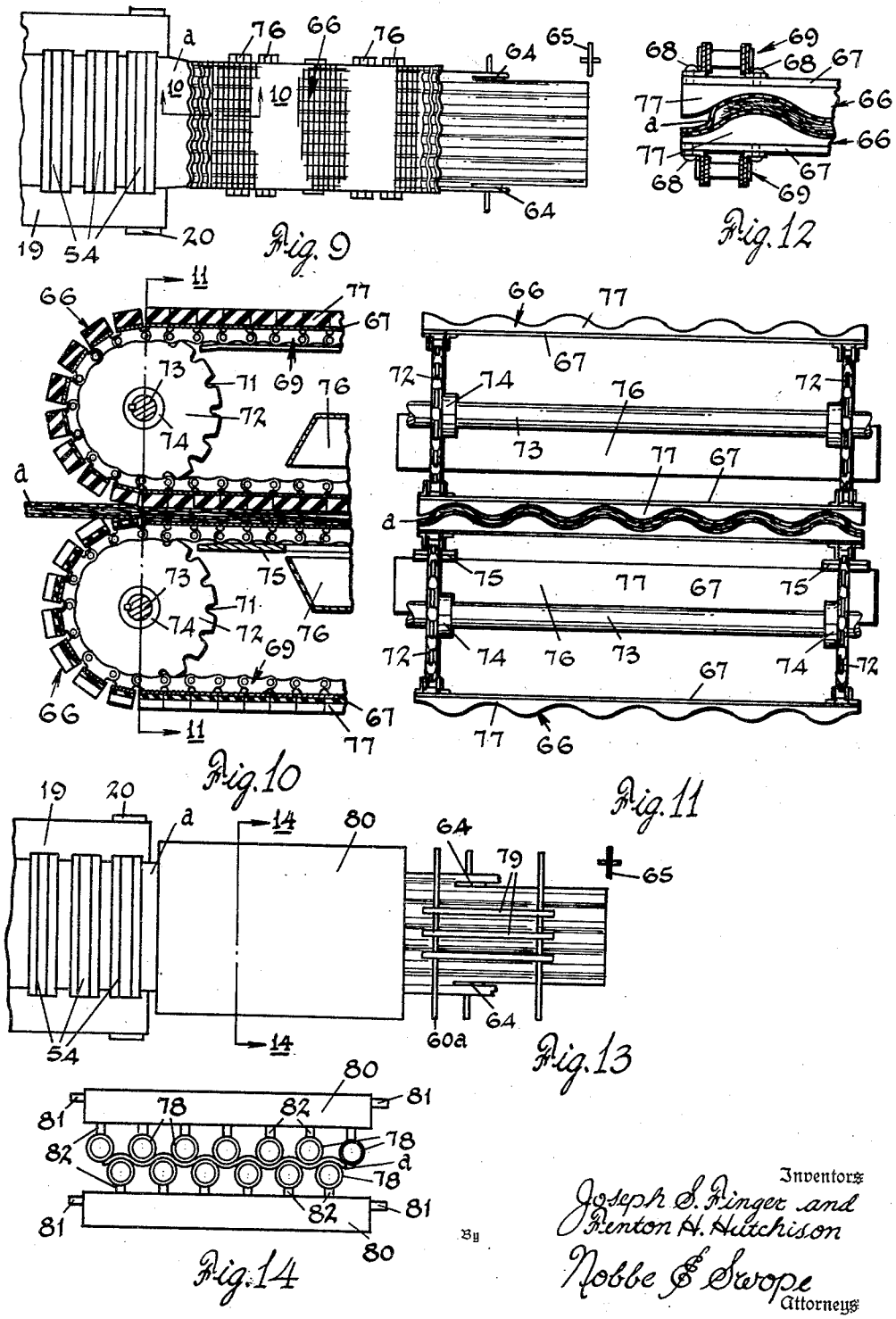
Inventors
Joseph S. Finger and
Fenton H. Hutchison
Nobbe & Swope
Attorneys

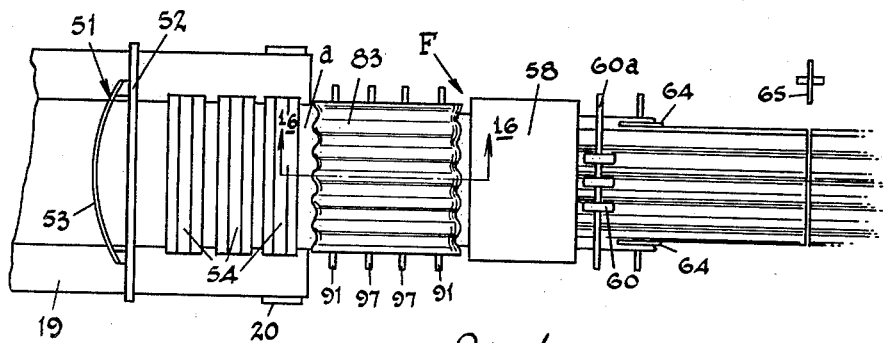
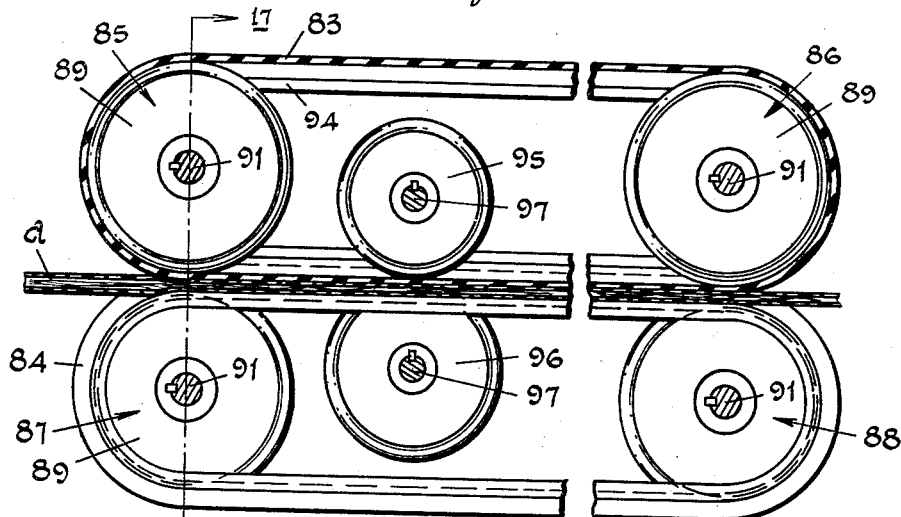
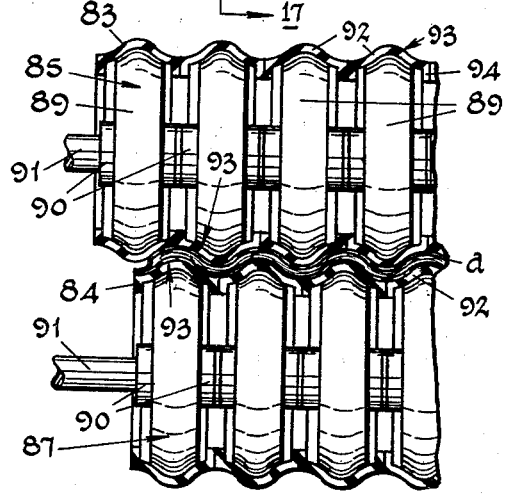

United States Patent Office 3,071,180
Patented Jan. 1, 1963

3,071,180
APPARATUS FOR CONTINUOUSLY PRODUCING REINFORCED PLASTIC STRUCTURAL PANELS
Joseph S. Finger, Bellaire, and Fenton H. Hutchison, Houston, Tex., assignors, by mesne assignments, to Johns-Manville Fiber Glass Inc., Cleveland, Ohio, a corporation of Delaware
Filed Nov. 23, 1953, Ser. No. 393,804
14 Claims. (Cl. 156—519)

The present invention relates broadly to plastic products, and is more particularly concerned with a new and improved method and apparatus for continuously producing reinforced plastic structural panels.

It is accordingly an important aim of the present invention to provide a novel method and an apparatus for the continuous production of reinforced thermosetting plastic products of predetermined cross-section.

Another object of the invention lies in the provision of a method and apparatus for continuously producing reinforced plastic building panels adapted for use in domestic and industrial installations as walls, roofs, partitions, outdoor signs, canopies, awnings and fixture facings.

Another object of the present invention is to provide a method and an apparatus for continuously forming reinforced thermosetting plastic products of predetermined cross-section by partially curing a reinforced resin upon a flexible base, and then causing it to pass through forming means wherein the curing thereof is advanced to the desired point.

Yet another object of this invention is to provide an apparatus for continuously producing thermosetting plastic products of predetermined cross-section comprising means for continuously forming a make-up which includes a base and a reinforced thermosetting plastic, means for partially hardening the thermosetting resin to thereby fix the physical relation of resin to reinforcing material, and means for advancing the partially cured reinforced resin through a forming mechanism including means to substantially further the curing process.

A further and important object of the present invention is the provision of a method and means for producing a reinforced plastic article of predetermined cross-section in which the reinforcing material is severed into short lengths for better dispersion in the plastic, the reinforced plastic being laid upon a flexible base and then being partially cured to a state where it may be pulled through forming means of predetermined cross-section where the curing of the partially cured reinforced plastic is substantially advanced.

A still further object of this invention is to provide a novel method and apparatus of producing, without substantial interruption, reinforced structural panels including means for accurately controlling the amount of resin which is flowed onto a flexible base or surface, means for accomplishing a more thorough impregnation of the reinforcing medium by the resin, and means in combination with curing means for imparting the desired cross-sectional configuration to a resin impregnated assembly.

Other objects and advantages of the invention will become more apparent during the course of the following description, particularly when taken in connection with the accompanying drawings.

In the drawings wherein like numerals are employed to designate like parts throughout the same:

FIG. 1 is a perspective view of a reinforced plastic structural panel as produced in accordance with the present invention;

FIG. 2 is a diagrammatic illustration of an apparatus constructed according to the invention;

FIG. 3 is a continuation of the apparatus shown in FIG. 2, the left hand of the portion of the apparatus shown in FIG. 3 continuing from the right hand portion of the apparatus of FIG. 2;

FIG. 4 is a diagrammatic plan view of apparatus suitable for carrying out the method of the present invention;

FIG. 5 is a cross-section taken substantially along the line 5—5 of FIG. 4, and illustrates one type of forming means;

FIGS. 6, 7 and 8 are perspective views of various forms of metering devices which may be used to control the resin flow onto the base;

FIG. 9 is a diagrammatic plan view showing a modified form of continuous forming means;

FIG. 10 is a longitudinal vertical section taken substantially along the line 10—10 of FIG. 9;

FIG. 11 is a transverse vertical section taken substantially along the line 11—11 of FIG. 10;

FIG. 12 is an enlarged detail view of sprocket means for the forming apparatus of FIG. 9, 10 and 11;

FIG. 13 is a diagrammatic plan view of a further type of continuous forming means;

FIG. 14 is a transverse vertical section taken substantially along the line 14—14 of FIG. 13;

FIG. 15 is a diagrammatic plan view of a further form of apparatus suitable to continuously impart the desired cross-section to a film-encased assembly;

FIG. 16 is a longitudinal vertical section taken substantially along the line 16—16 of FIG. 15; and FIG. 17 is a transverse vertical section taken substantially along the line 17—17 of FIG. 16.

With reference now to the drawings, there is illustrated in FIG. 1 a reinforced plastic panel of the character produced in accordance with the method and apparatus of the present invention. Such a panel, designated in its entirety by the numeral 15, preferably comprises a substantially rigid plastic body 16 within which is randomly dispersed a fibrous reinforcing core 17.

The plastic base 16 is preferably formed of a thermosetting resin of the polyester type, and among those which are commercially available are the Laminac polyester resins of American Cyanamid Company. However, it may at times be desired to use other than polyester resins, and among those which are suitable are residues of certain of the phenol or urea formaldehyde resins, the acrylic resins, and many other resins of the clear type. In addition, certain catalysts may be employed to aid in forming a hard, strong solid mass, and for this purpose, benzoyl peroxide, tertiary butyl perbenzoate, methyl-ethyl ketone peroxide and the like are quite satisfactory. To obtain the desired color, one of the relatively light-fast pigments or dyes which are not affected by the other components of the formulation may be added to the resin.

The fibrous reinforcing core 17 is preferably formed of a plurality of relatively short lengths 18 of glass yarns, designated in the art as chopped strand or chopped roving. Although glass yarns are preferred by virtue of their exceptionally high strength-weight ratio, and for numerous other reasons, certain other types of fibrous materials may be utilized in place of glass yarns, or in combination therewith. For this purpose, fibers formed of cellulose or a cellulose base, nylon, rayon, or certain of the vegetable, synthetic or mineral fibers may be effectively employed.

FIGS. 2, 3 and 4 illustrate apparatus which has proven successful in production in order to practice the present method. As shown, the apparatus comprises a station A at which a suitable resinous material is controllably flowed onto a flexible film; a station B where the reinforcing fibers are randomly distributed onto the resin coated film; a station C at which a more thorough impregnation of the fibers is accomplished; a station D at which an additional flexible film is laid over the reinforced resinous assembly and thereafter where wrinkles and air may be removed from the envelope; station E identified as the partially curing operation; station F where the partially cured structure is given the desired cross-sectional configuration and drawn through forming means wherein the curing thereof is substantially advanced; and station G at which the edges of the cured panel are trimmed. The entire make-up operation is continuous and the specific structural features thereof will now be described.

Referring now to FIG. 2, the continuous forming apparatus may include the endless belt 19 disposed about rollers 20, which belt conveys the various elements of the make-up through the above stations A through E while said elements are being formed into a film-encased reinforced plastic envelope.

A roll 21 of a suitable flexible film 22, such as cellophane, cellulose acetate and the like, is preferably drawn forwardly beneath and around the roller 23 and around and over the roller 24, thereafter passing under the laydown roller 25 where the film is placed upon the upper surface of the endless conveyor belt 19. The rollers 23 and 24 are vertically disposed relative to one another, and function to maintain the film under the desired tension.

It is desirable to provide a channel or trough in the film 22 when adding liquid plastic and reinforcing material thereto in order to prevent spilling of the materials. For this purpose, a guide fence or rail 26 is provided which extends along each longitudinal edge of the conveyor belt 19 from the laydown roller 25 and preferably up to the station D. However, it may at times be desirable to terminate the guide fence 26 somewhat earlier as in the region of the station B.

Spaced from the laydown roller 25 is a hopper or other suitable means 27 containing liquid plastic 28, as of the polyester type, which flows downwardly from the mouth of said hopper into the flat trough or channel formed in the flexible film 22 by the guide rails 26.

In order to smooth out, control the flow thereof, and evenly distribute the liquid plastic in said channel on the lower film, novel means are herein provided to meter said plastic. Such means may comprise a saw-toothed wax-treated cardboard member attached forwardly of the hopper 27, or a substantially cylindrical roller 29 (FIGS. 2 and 4) positioned in flowing contact with the resin. Preferably, however, the metering device is of the character shown in either of FIGS. 6, 7 or 8.

As illustrated in FIG. 6, the metering device may comprise a cylindrical roller 29a extending substantially entirely across the path of the moving assembly and a sawtoothed member 30 which may be formed of a wax-treated fiber-board and which is supported by a mounting member 31. Both the roller and the saw-toothed member are in flowing engagement with the resin, and operate to assure that only controlled amounts of resin will flow forwardly onto the film 22. As an alternative, the metering device may include a substantially cylindrical roller 32 carrying on its circumference longitudinally extending serrations 33 which provide therebetween longitudinal pockets 34 effective to deliver the desired quantity of resin. As a further alternative, accurate control over the amount and distribution of resin may be accomplished by a generally cylindrical roller 35 having on its circumference spaced radially extending grooves 36 which operate in cooperation with lands 37 to deter the resin from an uncontrollable flow.

Means are provided at station B to add reinforcing material to the liquid plastic and such means may include cutting apparatus of the type generally indicated at 38, said apparatus functioning to sever the glass roving 39 into short lengths 18. The cutting apparatus may comprise a pair of rolls 40 and 41 between which the roving 39 is drawn from a plurality of tubes or packages 39a and caused to travel in an arcuate path, at which point it is severed by the knives 42 of the chopping roller 43. Although only one chopping device is shown in the drawings it may at times be desired to arrange a multiplicity of choppers in longitudinal succession to obtain better coverage of the fibers by the resin.

The short lengths fall by gravity into the hood 44 and onto the liquid plastic 28, thereby providing an excellent dispersion of random lengths of glass roving throughout the liquid plastic. By chopping the reinforcing material into short lengths, as for example four inches, it has been found that less air or gas is entrapped than in the interstices of materials such as mat. In addition, since the fibers are not bound together by resin, they wet out more readily. Further, with chopped strand there is no mat binder to add to the air entrapment problem.

Positioned in spaced relation to the hood 44 and generally constituting station C is a pair of impregnating rollers 45 and 46. These rollers are of the spiral type, and effectively operate to firmly press upstanding ends or edges of glass fibers into the liquid plastic 28. For this purpose, the rollers are provided with raised ribs and are located above the belt 19 so as to make a light pressing contact upon the impregnated resinous assembly. It is to be noted that the rollers are spiraled in opposite directions from one another. This arrangement has been found the most satisfactory because it operates to flow a resin bead forwardly and backwardly across the reinforced resin, and this provides the desired continuous wetting of the rollers. Thereby, sticking of the fibers to the rollers is substantially avoided and a more uniform reinforcement produced. Further, by having the rollers spiraled in opposite directions, the tendency of the fibrous reinforcement to be pushed off to one side by the first roller is counteracted by the second roller.

A second roll 47 of suitable flexible film 48 is provided, said film passing through the rollers 49 and 50, and being smoothly placed upon the upper surface of the reinforced liquid plastic by means of the lowermost roller 50.

Prior to actually laying the second cellophane type film onto the glass embedded resin mass, it may at times be desirable to spray or otherwise apply a suitable accelerator on said mass to promote the gellation of the resin therein. Accelerators which are effective for this purpose are cobalt naphthenate, cobalt lineoresinate and lauryl mercaptan. Or if desired, substantially the same results may be accomplished by the provision of a plurality of hoppers in generally the position of the resin hopper 27 shown in the drawings. One hopper may contain approximately one half of the resin and all of the catalyst, and the other hopper the other half of the resin and all of the accelerator, said hoppers being arranged to flow the composite mixture onto the lower film. Or, each of the hoppers may contain the three ingredients in various proportions, and the contents of the hoppers may be combined just prior to reaching the film. Such an arrangement will lead to longer life of the ingredients in the hoppers, and improved handling characteristics.

As will be subsequently noted in greater detail it is quite important to the strength and appearance of the final article that excess air and resin be removed from the reinforced plastic positioned between the flexible films 22 and 48 and that their marginal edges be sealed. There is accordingly provided a pressing device 51, which may be carried by suitable framework supporting the herein disclosed make-up apparatus, said pressing device comprising a transversely extending mounting member 52 to which is secured under tension a bowed metal strip 53. The strip is positioned (FIG. 2) relative to the upper flexible film so as to exert a pressing force thereon, thereby functioning to lay down the upper film and to sweep rearwardly and sidewardly of the enclosed assembly substantially all of the excess air and resin residing therebetween. As will also be noted later, additional means in the form of a squeegee may be employed in combination with the pressing device 51.

Prior to forming the film-encased reinforced plastic into the desired shape, and in order to give it sufficient strength to be pulled and to facilitate its handling, it is desirable at station E to initiate the polymerization of the plastic 28, that is, to fix the physical relation of resin to glass. There is, therefore, herein provided at station E a plurality of heating means, which means may comprise a series of transversely extending electric heating devices 54 carrying suitable resistance heaters therein. Or if desired, steam heat or a plurality of infra-red heating bulbs may be used instead.

The desired cross-sectional configuration and substantially complete polymerization of the resin in the partially cured assembly may be accomplished in either of several different ways, FIGS. 2, 3 and 4 illustrating what is presently the preferred embodiment of the invention.

As shown therein, the partially cured assembly, designated throughout as a, is pulled forwardly by belts or the like 55 over a female mold section 56 whereon it is pressed by a plurality of roller elements 57 and guided thereby through heated matching mold elements 58 and 59, said latter element 59 normally being an extension of the section 56. The belts 55 may be formed of a resilient material and are trained about pulleys 60 carried by the shafts 60a. Belts are provided both above and below the cured panel, and by frictional engagement therewith, draw the partially cured assembly through stations F and G. If desired, suitable rollers or other pulling means may be employed in place of the belts 55.

The roller elements 57 may be formed of wood or any other suitable material and carry thereon one or more rollers 61, which may also be of wood composition. The rollers 61 may be formed as an integral part of the elements 57, or may be a separate unit which is removable independently of said elements 57. The rollers 61 are arranged to contact the upper surface of the partially cured assembly a and to press said assembly downwardly by rolling contact into the groove or other cross-sectional arrangement provided by the mold section 56. In order to effect this result, it is of course desirable that the vertical axis of each of the rollers be in substantially exact alignment with the complementary groove in the mold 56 located therebeneath. The rollers are arranged to press the partially cured structure first in the central portion, and then in successive steps outwardly of the center to the marginal side edges thereof. Accordingly, as shown in FIGS. 2 and 4, the roller elements 57 are provided with an increasing number of rollers 61, such as, one, three, five, seven, nine, eleven and thirteen, depending of course upon the desired width of the final product.

The mold elements 58 and 59 are preferably formed of metal and present a corrugated cross-section such as is desired in the finished structural panel herein produced. The elements 58 and 59 are spaced from one another a distance sufficient to permit the partially cured assembly A to be drawn readily therethrough, and at the same time to provide a limited frictional engagement therewith. Positioned beneath the mold elements is an open-top heating chamber 62 carying in its interior a plurality of heating lamps 63. Said lamps may be of the infra-red type, and are effective to substantially completely polymerize the plastic 28 and to convert it into a hard, strong and solid mass.

After the final curing has been substantially completed, the reinforced plastic panel is subjected to the action of saws, knives or the like 64 and 65 which are effective respectively to trim the longitudinal and transverse edges of the panel.

Illustrated in FIGS. 9 through 12 are means which may be employed as a substitute for the roller elements 57, mold members 56, 58 and 59, and the heating chamber 62 above described to continuously form and cure a film-encased fiber-resin structure a. Such means may comprise a resilient endless belt 66 suitably secured to plate members 67 attached by screws or the like 68 to a link assembly 69 having a sleeve 70 engageable with the notches 71 in sprockets 72. The sprockets are carried upon shafts 73 by means of hubs 74, and sag in the endless belt 66 is substantially avoided by means of supporting members 75 having suitable openings therein to allow heat from the curing means 76 to pass effectively therethrough to accomplish a substantially thorough polymerization of the reinforced resin.

The endless belts are preferably formed of a resilient material having a degree of rigidity effective to impart the desired corrugated cross-section to the partially cured assembly a. A moderately hard rubber is desirable for this purpose, and as shown in FIG. 10, the belts 66 are provided with corrugated treads or nubs 77 which press upwardly and downwardly on the film-encased assembly. The endless belts 66 are arranged to travel along the longitudinal path of movement of said partially cured structure, and as said structure passes therebetween, the desired corrugated cross-section is pressed therein and substantially simultaneously the resin advanced to its final or rigid stage.

FIGS. 13 and 14 illustrate a further modification of forming and curing means comprising a plurality of spaced, elongated rods or pipes 78 through which a heating medium is circulated and between the upper and lower banks of which the partially cured assembly is drawn by means of belts or the like 79. Each bank comprises a heating chamber 80, such as a substantially rectangular steam jacket, provided with inlet pipes 81 on its opposite sides and a plurality of longitudinally spaced supporting tubes 82 which additionally function as interconnecting means between the chamber 80 and pipes 78. As the partially cured assembly a is drawn between the heated pipes 78 by the belts 79, said pipes effectively corrugate the assembly and by virtue of the heat transferred from said pipes, an efficient and continuous method of producing substantially rigid corrugated structural panels is provided.

In FIGS. 15, 16 and 17 are shown additional means within the contemplation of the present invention which may be alternatively employed to impart the desired cross-sectional configuration to a partially cured film-encased resin and fiber assembly a. Such means are designed as a substitute for the roller means 57 shown in FIGS. 2, 4 and 5 and forming a part of station F illustrated therein. Thus, the present means function to initially impress upon the partially cured assembly a suitable cross-sectional shape, and in addition, to assist in causing forward movement of said assembly through curing and molding sections.

Means of this character preferably comprise a pair of endless flexible belts 83 and 84, which may be formed of extruded rubber, and four sets of drive pulleys, said sets being designated in their entirety by the numerals 85, 86, 87 and 88. The upper sets of pulleys 85 and 86, about which the belt 83 are trained, lie in substantially the same horizontal plane, as do the lower sets 87 and 88 carrying the belt 84. Further, as appears in FIG. 16, the pulley set 85 is preferably vertically aligned with the set 87, while the other upper set 86 is in vertical alignment with the other lower set 88.

Each pulley set 85, 86, 87 and 88 comprises a plurality of individual pulleys 89 supported side by side upon bearings 90 and spaced thereby in predetermined relation upon a shaft 91. The face of each pulley is preferably crowned to provide a generally convex surface engageable with the individual rubber sections 92 which are arranged in side by side relation and combine to form the belts 83 and 84. The individual rubber sections 92 are preferably fabricated in extruded form from a moderately rigid rubber, and are shaped with a generally convex outer surface 93 provided at its opposite sides with flanges 94 which overlap a portion of the side faces of the pulleys 89 to make a close fitting contact therewith. The individual rubber sections may be separately carried by each of the pulleys, or may if desired, be vulcanized or otherwise secured together to provide a single unitary structure.

As shown in FIG. 17, the upper pulley set 85 is displaced either to the right or left of the lower set 87 so that the individual pulleys in the upper set are not in vertical end alignment with the pulleys of the lower set, and vice versa. Rather, each pulley in the upper set is arranged to contact the space between the pulleys in the lower set, and vice versa, in order that the rubber sections carried by each of said pulleys are similarly out of phase. Thus, by this arrangement, the convex surface 93 of the rubber sections 92 carried by the lower pulley set 87 makes pressing contact with the concave region 94 between the convex surface 93 of the sections 92 supported by the upper pulley, and of course the reverse is true as regards the action of the rubber sections carried by the upper pulleys on the lower rubber sections.

The novel arrangement above described functions effectively to impart a corrugated cross-section to a film-encased reinforced resinous assembly a which is caused to pass between the rubber belts 83 and 84. However, because of the semi-resilient nature of said belts, which have a tendency to sag in their longitudinal central portions, it is desirable that additional forming means be positioned between the sets of pulleys 85 and 87 and between the sets 86 and 88. Such means preferably comprise sets of auxiliary pulleys 95 and 96 supported upon shafts 97 and in pressing contact with the lower flight of the upper belt 83 and upper flight of the lower belt 84. As is apparent, as many sets of auxiliary pulley sets or forming means may be provided as are desired, two of such sets being shown by way of example in FIG. 15. The auxiliary pulley sets have the structural characteristics of the sets 85, 86, 87 and 88, however, they are as shown, relatively smaller.

Subsequent to being initially formed into a corrugated structure, the resin-glass envelope a is caused to advance through mold sections 58 and 59 of the type shown best in FIGS. 2 and 3 wherein it is substantially completely cured, and thereafter the sides and ends may be trimmed by saws or other suitable means 64 and 65 corresponding to those of FIG. 3.

The various elements of the apparatus may be actuated by suitable driving means and linkage which are not shown as no detailed description thereof is deemed necessary.

While it is believed that the operation of the apparatus is perfectly clear from the foregoing description, a typical operation is as follows: Flexible cellulose acetate film 22 is unwound from the reel 21 and placed on the conveyor belt 19 by means of the rollers 23 and 24. The flexible film is formed into a trough or channel by the guide fences 26 and the roller 25. Liquid plastic, such as polyester resin 28 containing a catalyst of benzoyl peroxide, is added to the channel by gravity flow from the hopper 27. This resin is distributed evenly upon the lower flexible film and the quantity thereof controlled by means of either of the metering devices shown in FIGS. 6, 7 and 8. Glass roving 39 from the tube 39a is severed into short lengths 18 by the cutting apparatus 38 and permitted to fall by gravity through the hood 44 and onto the catalyzed polyester resin where it is substantially evenly dispersed throughout the resin without entrapping substantial amounts of air. Portions of these chopped glass fibers extend upwardly from the resin, and the spiral rollers 45 and 46 press downwardly upon and thereby impregnate the glass fibers which extend upwardly from the resin.

An upper or second flexible film of cellulose acetate 48 is applied to the top of the reinforced resin by the rollers 49 and 50, and excess air and resin driven from the assembly by means of the pressing device 51 and additional hand squeegees, if desired.

By the use of such means, a structure is produced in which the central portion of the assembly comprises the resin mass 28 wherein short lengths 18 of roving 39 are substantially equally distributed throughout, while outwardly of the central portion a relatively lesser amount of fibers are found and the space between the films 22 and 48 is principally resin. Even further outwardly thereof the films are in pressing contact, by action of the squeegee and hand pressure, if desired. And at the extreme outer edges of the assembly a resin bead is formed. The bead contains the major portion of the excess resin which has been removed by the pressing device 51 and squeegee pressure from the central portion of the assembly. As thus produced, the bead functions in combination with the adjacent pressed-together portions of the films 22 and 48 to prevent the entry of air into the assembly during the subsequent curing operations. Such a structure is more specifically described in the application of Joseph S. Finger, Serial No. 370,469, filed July 27, 1953, now abandoned.

The conveyor belt 19, of course, moves the film and added elements along and moves the encased reinforced resin past the bank of heating means 54 where the resin is partially cured by resistance heaters or the like.

After leaving the pre-curing section E, the assembly a is either drawn forwardly by the belts 55 in the manner of FIGS. 4, 13 or 15 and through the mold elements 58 and 59, or between the pipes 78. Or if desired, the partially cured structure may be formed and cured by the means shown in FIGS. 9 to 12. Saws and the like may then be provided to trim the product longitudinally and laterally into desired lengths as indicated. The cellulose acetate film may then be removed, leaving a product which is suitable for use in the construction and building trades.

The films employed may be of any of the conventional flexible films known to the art, such as cellophane (regenerated cellulose), polyvinyl alcohol film, metal foil, cellulose acetate, nitrate sheets and the like. The type of finish desired upon the final products and other considerations control the selection of the film desired by the operator. For example, if a decorative surface is to be provided, a cellulose acetate film which shrinks less on curing than the reinforced resin may be utilized which provides a substantially uniformly wrinkled decorative surface. Such a film is described in the copending application of Joseph S. Finger, entitled Decorative Surface Thermosetting Plastics, Serial No. 227,444, filed May 20, 1951, now abandoned.

It is obvious that the composition, size and character of the desired product will in a large measure determine the optimum "curing" conditions and these factors may be varied considerably. Further, it may be desired to not corrugate the partially cured assembly a, and for this purpose said assembly may be substantially polymerized in a continuous manner.

In addition, it will be appreciated that the use of upper and lower flexible films is not always necessary, and that as a substitute therefor, a continuous belt formed of a material such as steel may be employed in the make-up operation and a gel resin film formed thereon from a plastic, such as for example, one of the polyesters. The reinforced resin may then be produced on said gel resin film, and an upper gel film formed over the reinforced resin. By such an arrangement the gel film becomes an integral part of the reinforced resin, and stripping of the films from the reinforced resin rendered no longer necessary.

It is therefore apparent that the continuous process of producing reinforced plastic articles of predetermined cross-section in accordance with the invention is quite flexible and that the elements of the apparatus may be considerably varied according to the particular circumstances. It is to be understood therefore that the foregoing detailed description is given merely by way of illustration and that many variations may be made therein without departing from the spirit of the invention and the scope of the appended claims.

We claim:

1. An apparatus for continuously producing a plastic product of predetermined cross-section comprising, an endless belt conveyor for carrying liquid plastic arranged upon a flexible base, channel means on said conveyor for preventing lateral flow of liquid plastic, fiber depositing means disposed above said conveyor for depositing reinforcing fibers on the liquid plastic, heating means located between opposite ends of said conveyor for partially hardening the liquid plastic, forming means of predetermined cross-section spaced from said heating means, means for moving the partially hardened plastic through the forming means, and additional heating means associated with the forming means to advance the hardening of the partially hardened plastic while said plastic is being moved through said forming means.

2. Apparatus of the character defined in claim 1, in which the forming means comprises a pair of spaced molding elements between which the partially hardened plastic is caused to pass.

3. Apparatus of the character defined in claim 1, in which the forming means comprises a lower mold element having a longitudinally corrugated surface, an upper mold element having a corrugated surface complementary to the corrugated surface of the lower mold, the rearward portion of such upper mold element being spaced forwardly of the rearward portion of the lower mold element, and guide rollers extending into the rearward portion of the lower corrugated surface for initially forming the partially hardened plastic and for guiding said plastic into the mold elements.

4. Apparatus of the character defined in claim 3, in which the guide rollers comprise at least a pair of spaced rollers and complementary rolling elements on each of such rollers.

5. Apparatus of the character defined in claim 1, in which the forming means comprises a pair of longitudinally movable molding elements provided with complementary mold surfaces.

6. Apparatus of the character defined in claim 5, in which the complementary mold surfaces are provided with a plurality of resilient, spaced and interconnected pressing elements.

7. Apparatus of the character defined in claim 1, in which the forming means comprises a plurality of spaced, longitudinally extending heated tubular members.

8. An apparatus for continuously producing reinforced plastic products of predetermined cross-section comprising, a body, means on the body for providing a flexible film, conveying means on said body for receiving the flexible film, guide rails on said conveying means forming a shallow U-shaped channel, a hopper for providing liquid plastic to the flexible film, chopping means on the body for chopping glass fibers and causing the chopped fibers to fall freely downwardly in random fashion onto the liquid plastic, additional means on the body for placing a second flexible film onto the surface of and encasing the liquid plastic and glass fibers in such flexible film, a first heating element on the body for partially curing the liquid plastic and glass fibers encased in the flexible films, conveyor means on the body for conveying the first mentioned flexible film, liquid plastic, glass fibers, and second flexible film beyond the first heating element, forming means of predetermined cross-section spaced from said first heating element, means to move the partially cured plastic through the forming means, and a second heating element on the body disposed proximate the forming means so that the partially cured plastic is substantially completely cured while being moved through said forming means.

9. Apparatus of the character defined in claim 8, in which there is provided roller means adjacent the hopper for accurately controlling the quantity and distribution of liquid plastic deposited on the flexible film, and in which the forming means comprises a pair of spaced molding elements between which the partially cured plastic is caused to pass.

10. Apparatus of the character defined in claim 8, in which the forming means comprises a lower mold member having a longitudinally corrugated surface, an upper mold member having a corrugated surface complementary to the corrugated surface of the lower mold member, the rearward portion of such upper mold member being spaced forwardly of the rearward portion of the lower mold member, and guide rollers extending into the rearward portion of the lower corrugated surface for initially forming the paritally cured plastic and for guiding said plastic into the mold members.

11. Apparatus of the character defined in claim 10, in which the guide rollers comprise at least a pair of spaced rollers and complementary rolling elements on each of such rollers.

12. An apparatus for continuously producing a plastic product of predetermined cross section, comprising a movable belt conveyor, guide rails on each side of said conveyor, means for providing a flexible film on the conveyor, a hopper for depositing liquid plastic on the flexible film, means for depositing individual lengths of glass fibers onto the liquid plastic, means above the conveyor for pressing the glass fibers into a completely submerged position in the liquid resin, means for placing a second flexible film on the liquid plastic containing the fibers imbedded therein, means for pressing out entrained air from between the first and second flexible films, heating means between opposed ends of the conveyor for partially curing the liquid plastic and retaining the glass fibers in a fixed imbedded positon while the plastic and films are supported by the conveyor, forming means of predetermined cross section spaced from said heating means, means to pull the partially cured plastic through the forming means, and additional heating means disposed proximate the forming means to substantially completely cure the partially cured plastic while said plastic is being pulled through said forming means.

13. Apparatus for continuously producing shaped plastic panels of predetermined cross section from a continuous laminate including a layer of liquid thermosetting plastic containing fiber reinforcement and sandwiched between a pair of plastic-impervious flexible sheets, comprising a conveyor for moving said laminate along a predetermined path, means positioned intermediate the ends of the conveyor to apply heat to the laminate while supported on the conveyor to partially cure the plastic, forming means having an opening of substantially constant and predetermined cross section positioned beyond the conveyor and through which the continuous laminate passes, heating means associated with the forming means for advancing the cure of the plastic while the laminate is passing through said forming means, and means for continuously moving the laminate through said forming means.

14. Apparatus for continuously producing shaped plastic panels of predetermined cross section from a continuous laminate including a layer of liquid thermosetting plastic containing fiber reinforcement and sandwiched between a pair of resin-impervious flexible sheets as claimed in claim 13, wherein the forming means includes a pair of spaced continuous belts between which the laminate is passed, said belts being provided with corrugations extending parallel to the path of travel of the laminate.

References Cited in the file of this patent

UNITED STATES PATENTS 622,038    Davis _____ Mar. 28, 1899

(Other references on following page)

UNITED STATES PATENTS

| | | |
|---|---|---|
| 762,033 | Ferres | June 7, 1904 |
| 775,541 | McConnell | Nov. 22, 1904 |
| 793,316 | McMillin | June 27, 1905 |
| 2,496,911 | Green | Feb. 7, 1950 |
| 2,500,728 | Williams | Mar. 14, 1950 |
| 2,526,945 | Gray | Oct. 24, 1950 |
| 2,547,880 | Meyer et al. | Apr. 3, 1951 |
| 2,571,335 | Browne | Oct. 16, 1951 |
| 2,631,955 | Muskat | Mar. 17, 1953 |
| 2,653,355 | Essman | Sept. 29, 1953 |
| 2,671,745 | Slayter | Mar. 9, 1954 |
| 2,784,763 | Shorts | Mar. 12, 1957 |